(12) United States Patent
Berger

(10) Patent No.: US 6,921,880 B2
(45) Date of Patent: Jul. 26, 2005

(54) APPARATUS FOR HEATING BOTTLES AND METHOD OF MANUFACTURING SAME

(75) Inventor: Russell Berger, Needham, MA (US)

(73) Assignee: Constance F. Berger, Naples, FL (US)

( * ) Notice: Subject to any disclaimer, the term of this patent is extended or adjusted under 35 U.S.C. 154(b) by 0 days.

(21) Appl. No.: 10/813,416

(22) Filed: Mar. 30, 2004

(65) Prior Publication Data

US 2004/0217102 A1 Nov. 4, 2004

Related U.S. Application Data

(60) Provisional application No. 60/471,019, filed on May 16, 2003, and provisional application No. 60/460,312, filed on Apr. 4, 2003.

(51) Int. Cl.$^7$ ................................................. F24C 7/10
(52) U.S. Cl. ....................................... 219/386; 219/528
(58) Field of Search .................................. 219/528–535

(56) References Cited

U.S. PATENT DOCUMENTS

| | | | |
|---|---|---|---|
| 2,541,218 A | | 2/1951 | Doerr ........................... 219/43 |
| 2,617,916 A | * | 11/1952 | Neidnig ....................... 219/527 |
| 3,904,519 A | | 9/1975 | McKinney, Jr. et al. |
| 4,154,244 A | | 5/1979 | Becker et al. |
| 4,172,859 A | | 10/1979 | Epstein |
| 4,191,231 A | | 3/1980 | Winchell et al. |
| 4,212,965 A | | 7/1980 | Campbell |

(Continued)

FOREIGN PATENT DOCUMENTS

| | | |
|---|---|---|
| EP | 0872258 | 10/1998 |
| EP | 0934755 | 8/1999 |
| WO | 9617883 | 6/1996 |
| WO | 9725093 | 7/1997 |
| WO | 9815199 | 4/1998 |
| WO | 9855171 | 12/1998 |
| WO | 9915078 | 4/1999 |
| WO | 9929353 | 6/1999 |
| WO | 9934855 | 7/1999 |
| WO | 9936119 | 7/1999 |
| WO | 9948548 | 9/1999 |
| WO | 0119425 | 3/2001 |

OTHER PUBLICATIONS

Joseph R. Flesher, Jr.; Modern Plastics *Polyether block amide: high–performance TPE*; Sep. 1987, four pages starting on p. 100.

Technical Information; Pebax Resins, 33 Series Property Comparison.

*Primary Examiner*—Thor S. Campbell
(74) *Attorney, Agent, or Firm*—Barlow, Josephs & Holmes, Ltd.

(57) ABSTRACT

An apparatus (10) for warming a vessel (12), such as a baby bottle with milk or formula therein, includes a panel of expandable material (14) having a number of flexible heating elements (26) embedded therein. The expandable material includes an outer layer of neoprene rubber (46) and an inner layer of stretchable polyester material (28), such as lycra. The heating elements (26) are finger-like in construction and can flexibly adjust relative to one another to closely accommodate and conform to a baby bottle (12) inserted into the apparatus (10). The heating elements (26) are made of an electrically resistive material and receive electricity from a power supply.

15 Claims, 8 Drawing Sheets

U.S. PATENT DOCUMENTS

| | | |
|---|---|---|
| 4,276,250 A | 6/1981 | Satchell et al. |
| 4,290,428 A | 9/1981 | Durand et al. |
| 4,385,635 A | 5/1983 | Ruiz |
| 4,444,816 A | 4/1984 | Richards et al. |
| 4,490,421 A | 12/1984 | Levy |
| 4,563,181 A | 1/1986 | Wijayarathna et al. |
| 4,617,355 A | 10/1986 | Gabbert et al. |
| 4,636,346 A | 1/1987 | Gold et al. |
| 4,657,024 A | 4/1987 | Coneys |
| 4,665,557 A | 5/1987 | Kamp |
| 4,739,768 A | 4/1988 | Engelson |
| 4,753,980 A | 6/1988 | Deyrup |
| 4,775,371 A | 10/1988 | Mueller, Jr. |
| 4,810,859 A * | 3/1989 | Anabtawi et al. ............ 219/535 |
| 4,833,299 A | 5/1989 | Estes ........................ 219/311 |
| 4,861,830 A | 8/1989 | Ward, Jr. |
| 4,898,591 A | 2/1990 | Jang et al. |
| 4,906,244 A | 3/1990 | Pinchuk et al. |
| 4,938,676 A | 7/1990 | Jackowski et al. |
| 4,950,239 A | 8/1990 | Gahara et al. |
| 4,963,313 A | 10/1990 | Noddin et al. |
| 4,964,409 A | 10/1990 | Tremulis |
| 5,017,259 A | 5/1991 | Kohsai |
| 5,017,325 A | 5/1991 | Jackowski et al. |
| 5,036,118 A | 7/1991 | Martinez |
| 5,045,072 A | 9/1991 | Castillo et al. |
| 5,049,109 A | 9/1991 | Radovic et al. |
| 5,085,649 A | 2/1992 | Flynn |
| 5,147,332 A | 9/1992 | Moorehead |
| 5,180,376 A | 1/1993 | Fischell |
| 5,208,269 A | 5/1993 | Brown |
| 5,221,270 A | 6/1993 | Parker |
| 5,222,949 A | 6/1993 | Kaldany |
| 5,234,416 A | 8/1993 | Macaulay et al. |
| 5,246,705 A | 9/1993 | Venkatraman et al. |
| 5,258,160 A | 11/1993 | Utsumi et al. |
| 5,264,260 A | 11/1993 | Saab |
| 5,270,086 A | 12/1993 | Hamlin |
| 5,295,962 A | 3/1994 | Crocker et al. |
| 5,300,048 A | 4/1994 | Drewes, Jr. et al. |
| 5,304,340 A | 4/1994 | Downey |
| 5,306,246 A | 4/1994 | Sahatjian et al. |
| 5,318,587 A | 6/1994 | Davey |
| 5,328,468 A | 7/1994 | Kaneko et al. |
| 5,330,428 A | 7/1994 | Wang et al. |
| 5,338,296 A | 8/1994 | Dalessandro et al. |
| 5,342,299 A | 8/1994 | Snoke et al. |
| 5,342,386 A | 8/1994 | Trotta |
| 5,344,401 A | 9/1994 | Radisch et al. |
| 5,368,564 A | 11/1994 | Savage |
| 5,380,304 A | 1/1995 | Parker |
| 5,385,173 A | 1/1995 | Garglulo |
| 5,399,164 A | 3/1995 | Snoke et al. |
| 5,408,068 A | 4/1995 | Ng ............................ 219/202 |
| 5,423,764 A | 6/1995 | Fry |
| 5,423,838 A | 6/1995 | Willard |
| 5,433,713 A | 7/1995 | Trotta |
| 5,436,429 A | 7/1995 | Cline ........................ 219/202 |
| 5,451,747 A | 9/1995 | Sullivan et al. |
| 5,454,795 A | 10/1995 | Samson |
| 5,456,674 A | 10/1995 | Bos et al. |
| 5,496,294 A | 3/1996 | Hergenrother et al. |
| 5,498,250 A | 3/1996 | Prather |
| 5,499,975 A | 3/1996 | Cope et al. |
| 5,507,725 A | 4/1996 | Savage et al. |
| 5,522,961 A | 6/1996 | Leonhardt |
| 5,531,715 A | 7/1996 | Engelson et al. |
| 5,533,985 A | 7/1996 | Wang |
| 5,542,925 A | 8/1996 | Orth |
| 5,542,937 A | 8/1996 | Chee et al. |
| 5,545,133 A | 8/1996 | Burns et al. |
| 5,554,120 A | 9/1996 | Chen et al. |
| 5,554,121 A | 9/1996 | Ainsworth et al. |
| 5,554,139 A | 9/1996 | Okajima |
| 5,556,383 A | 9/1996 | Wang et al. |
| 5,565,523 A | 10/1996 | Chen et al. |
| 5,569,218 A | 10/1996 | Berg |
| 5,584,821 A | 12/1996 | Hobbs et al. |
| 5,599,291 A | 2/1997 | Balbierz et al. |
| 5,599,305 A | 2/1997 | Hermann et al. |
| 5,599,325 A | 2/1997 | Ju et al. |
| 5,620,649 A | 4/1997 | Trotta |
| 5,622,665 A | 4/1997 | Wang |
| 5,649,906 A | 7/1997 | Gory et al. |
| 5,649,909 A | 7/1997 | Cornelius |
| 5,671,780 A | 9/1997 | Kertesz |
| 5,695,482 A | 12/1997 | Kaldany |
| RE35,717 E | 1/1998 | Nahm |
| 5,707,332 A | 1/1998 | Weinberger |
| 5,714,110 A | 2/1998 | Wang et al. |
| 5,728,063 A | 3/1998 | Preissman et al. |
| 5,755,690 A | 5/1998 | Saab |
| 5,769,817 A | 6/1998 | Burgmeier |
| 5,769,830 A | 6/1998 | Parker |
| 5,772,641 A | 6/1998 | Wilson |
| 5,792,105 A | 8/1998 | Lin et al. |
| 5,792,124 A | 8/1998 | Horrigan et al. |
| 5,795,325 A | 8/1998 | Valley et al. |
| 5,797,877 A | 8/1998 | Hamilton et al. |
| 5,807,520 A | 9/1998 | Wang et al. |
| 5,814,061 A | 9/1998 | Osborne et al. |
| 5,826,588 A | 10/1998 | Forman |
| 5,833,657 A | 11/1998 | Reinhardt et al. |
| 5,836,925 A | 11/1998 | Soltesz |
| 5,879,499 A | 3/1999 | Corvi |
| 5,891,110 A | 4/1999 | Larson et al. |
| 5,900,444 A | 5/1999 | Zamore |
| 5,906,605 A | 5/1999 | Coxum |
| 5,908,413 A | 6/1999 | Lange et al. |
| 5,911,715 A | 6/1999 | Berg et al. |
| 5,913,857 A | 6/1999 | Ritchart et al. |
| 5,919,570 A | 7/1999 | Hostettler et al. |
| 5,921,915 A | 7/1999 | Aznoian et al. |
| 5,947,940 A | 9/1999 | Beisel |
| 5,948,489 A | 9/1999 | Hopkins |
| 5,951,494 A | 9/1999 | Wang et al. |
| 5,951,929 A | 9/1999 | Wilson |
| 5,951,941 A | 9/1999 | Wang et al. |
| 5,961,532 A | 10/1999 | Finley et al. |
| 5,981,910 A * | 11/1999 | Williams et al. ............ 219/386 |
| 5,992,000 A | 11/1999 | Humphrey et al. |
| 5,993,415 A | 11/1999 | O'Neil et al. |
| 5,998,551 A | 12/1999 | O'Neil et al. |
| 6,036,682 A | 3/2000 | Lange et al. |
| 6,042,588 A | 3/2000 | Munsinger et al. |
| 6,048,485 A | 4/2000 | Field et al. |
| 6,050,949 A | 4/2000 | White et al. |
| RE36,717 E | 5/2000 | Thompson |
| 6,165,165 A | 12/2000 | Cecchi et al. |
| 6,278,091 B1 | 8/2001 | Van Gooden ............... 219/528 |
| 6,353,211 B1 | 3/2002 | Chen ......................... 219/527 |
| 6,392,195 B1 * | 5/2002 | Zhao et al. ................. 219/204 |
| 6,488,149 B1 | 12/2002 | Montagnino ................ 206/320 |
| 6,596,818 B1 | 7/2003 | Zamore |

* cited by examiner

APPARATUS FOR HEATING BOTTLES AND METHOD OF MANUFACTURING SAME

CROSS-REFERENCE TO RELATED APPLICATIONS

This application claims priority from prior U.S. Provisional Application Ser. No. 60/460,312, filed on Apr. 4, 2003 and U.S. Provisional Application Ser. No. 60/471,019, filed on May 16, 2003.

BACKGROUND OF THE INVENTION

The present invention relates to child-related accessories. More specifically, the present invention relates to a flexible bottle warmer that is portable so it can be used during travel, such as in a vehicle.

It is well know that there is a desire to warm the milk or formula prior to feeding it to a young child. When in the home environment, the milk is typically warmed by first warming water in a saucepan on a stove and, then the bottle, with the milk therein, is placed in the water for the appropriate amount of time so that the milk reaches the desired temperature. Periodically, the milk must be tested to ensure that the optimum desired temperature is reached. Also, it has been known to place the baby bottle with the milk therein directly into a microwave for heating. If the correct cooking time and temperature are not properly selected, the milk could burn and the bottle itself can be damaged.

Therefore, there has been identified a need to reliably and safely warm (i.e. heat) a baby bottle with milk or formula therein to a desired temperature. To address this need, many bottle warmers have been attempted in the prior art. For the home, a known bottle warmer includes a blender-like construction with heated water therein. The bottle is placed into heated the water which is circulated at high speed about the bottle to heat it. This prior art apparatus heats up a bottle very quickly but, due to its size and requirement of water, it is impractical for use in a vehicle or outside the home.

A further example of a prior art bottle warmer includes a rigid housing with a cylindrical opening for receipt of the bottle therein. Heater elements reside within the housing to warm a bottle residing within the housing. They can plugged into a wall outlet or to a vehicle cigarette lighter via a 12 volt adapter. However, these prior art bottle heaters are large in size and not well suited for transport. Its rigid construction can only accommodate a standard cylindrical baby bottle. These rigid housings of prior art bottle warmers cannot accommodate the new baby bottle configurations that are not completely cylindrical in shape.

There also have been attempts in the prior to provide a flexible bottle warmer. These apparatus typically includes a length of material that is wrapped about the bottle. Heating elements are embedded within the material to provide heat to the bottle. While these prior flexible wrap-style heaters are compact and portable, they are difficult and cumbersome to install about a bottle and do not conform closely to the outer configuration of a bottle, particularly new baby bottles that include a bend in the neck and non-cylindrical configurations.

In view of the foregoing, there is a demand for bottle heater that can easily conform to a wide range of bottles, including those with non-cylindrical shapes and bends in the neck region. There is also a demand for a bottle warmer that is lightweight, compact and portable for easy transport. There is also a demand for a bottle warmer that can be used in a car outside the home. There is a further demand for a bottle warmer that is inexpensive yet be able to provide even and effective heat to a baby bottle.

SUMMARY OF THE INVENTION

The present invention preserves the advantages of prior art apparatus for heating vessels, such at bottles including baby bottles. In addition, it provides new advantages not found in currently available apparatus and overcomes many disadvantages of such currently available apparatuses.

The invention is generally directed to a novel and unique apparatus for heating a vessel, such as a baby bottle. The apparatus of the present invention includes a panel of expandable material having a number of flexible heating elements therein. The expandable material includes an outer layer of neoprene rubber and an inner layer of stretchable polyester material, such as lycra. The heating elements are finger-like in construction and can flexibly adjust relative to one another to closely accommodate and conform to a baby bottle inserted into the apparatus. The heating elements are made of an electrically resistive material and receive electricity from a power supply.

The present invention also includes a new novel method of manufacturing and assembling the apparatus of the present invention. The method includes first attaching an array of heating elements to a panel of stretchable polyester material having a first side and a second side and a top end and a bottom end. A panel of neoprene is attached to the top end of the panel of stretchable fabric. The panel of stretchable polyester material and panel of neoprene, with heating elements on the panel of polyester material, are formed into a tube having a first length. The panel of stretchable polyester is folded over the panel of neoprene into a tube having a second length shorter than the first length. The panel of stretchable polyester is secured to the panel of neoprene.

The apparatus for warming a vessel preferably operates on electricity. The heating elements are electrically interconnected to one another. A power supply interface, such as a vehicle cigarette lighter adapter plug, is attached to the heating elements to provide electricity thereto from a cigarette lighter in a vehicle.

It is therefore an object of the present invention to provide an apparatus for heating (warming) a vessel.

It is an object of the present invention to provide an apparatus for warming a bottle that closely conforms to the contour thereof for even warming.

It is a further object of the present invention to provide an apparatus for warming a bottle that is portable.

Another object of the present invention is to provide an apparatus for warming a bottle that is easy to use.

It is a further object of the present invention to provide an apparatus for warming a bottle that is simple and inexpensive to manufacture.

Another object of present invention is to provide an apparatus for warming a bottle that is rugged.

Another object of the present invention is to provide an apparatus for warming a bottle that is compact, lightweight and portable yet powerful.

A further object of the present invention is to provide an apparatus for warming a bottle that can be powered by a cigarette lighter in a vehicle.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
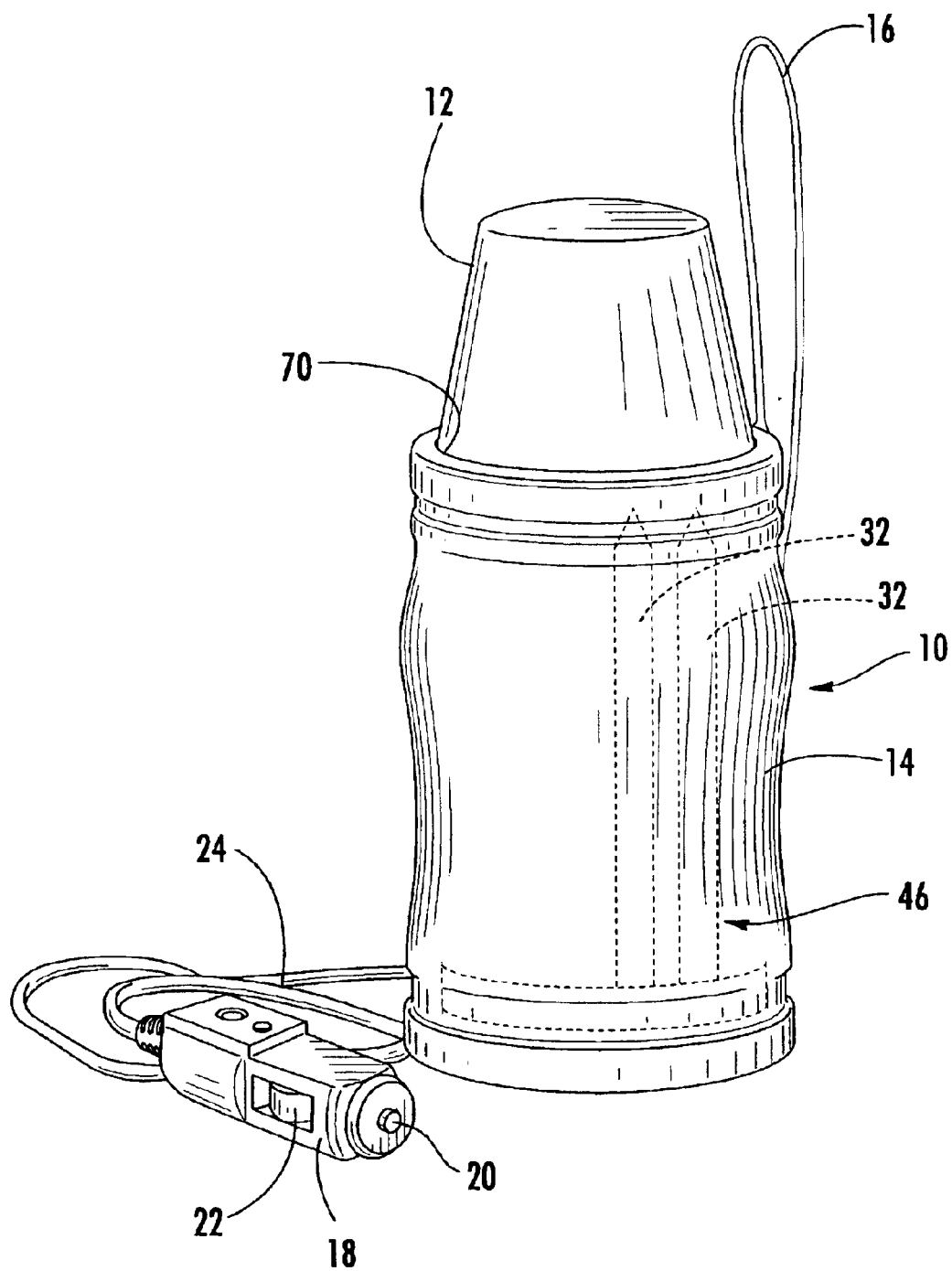
FIG. 1 is a perspective view of the bottle heating apparatus of the present invention with a bottle accommodated therein.

Referring first to FIG. 1, a perspective view of the apparatus 10 of the present invention for heating or warming an object, such as a baby bottle 12, is shown. The terms "heating" and "warming" are used interchangeable herein. The heating apparatus 10 includes a sack-like construction with a main body 14 with heating elements 26 contained therein, as will be described in detail below. Also, a lanyard 16 is connected to the main body 14 to facilitate hanging the apparatus 10 in a convenient position, such as over a knob on the dashboard of a vehicle.

Also seen in FIG. 1, is a vehicle cigarette lighter adapter 18 is preferably included for electrically interfacing with the heater elements in the main body 14 with a 12 volt cigarette lighter in a vehicle. As is well known in the art, the vehicle adapter 18 includes a first electrical contact 20 and a second electrical contact 22 for routing electricity from the cigarette lighter itself (not shown) to the heater elements via wire 24. As will be discussed below, a cigarette lighter adapter 18 is one of many different electrical interfaces that can be used to provide electricity to the heating elements 26 employed within the apparatus 10 of the present invention.

Turning now to FIG. 2–8, details of the construction of the apparatus 10 of the present invention is shown. Each step of the process of manufacturing will be discussed thereby illustrating the construction of the apparatus 10 of the present invention.

Figure 2:
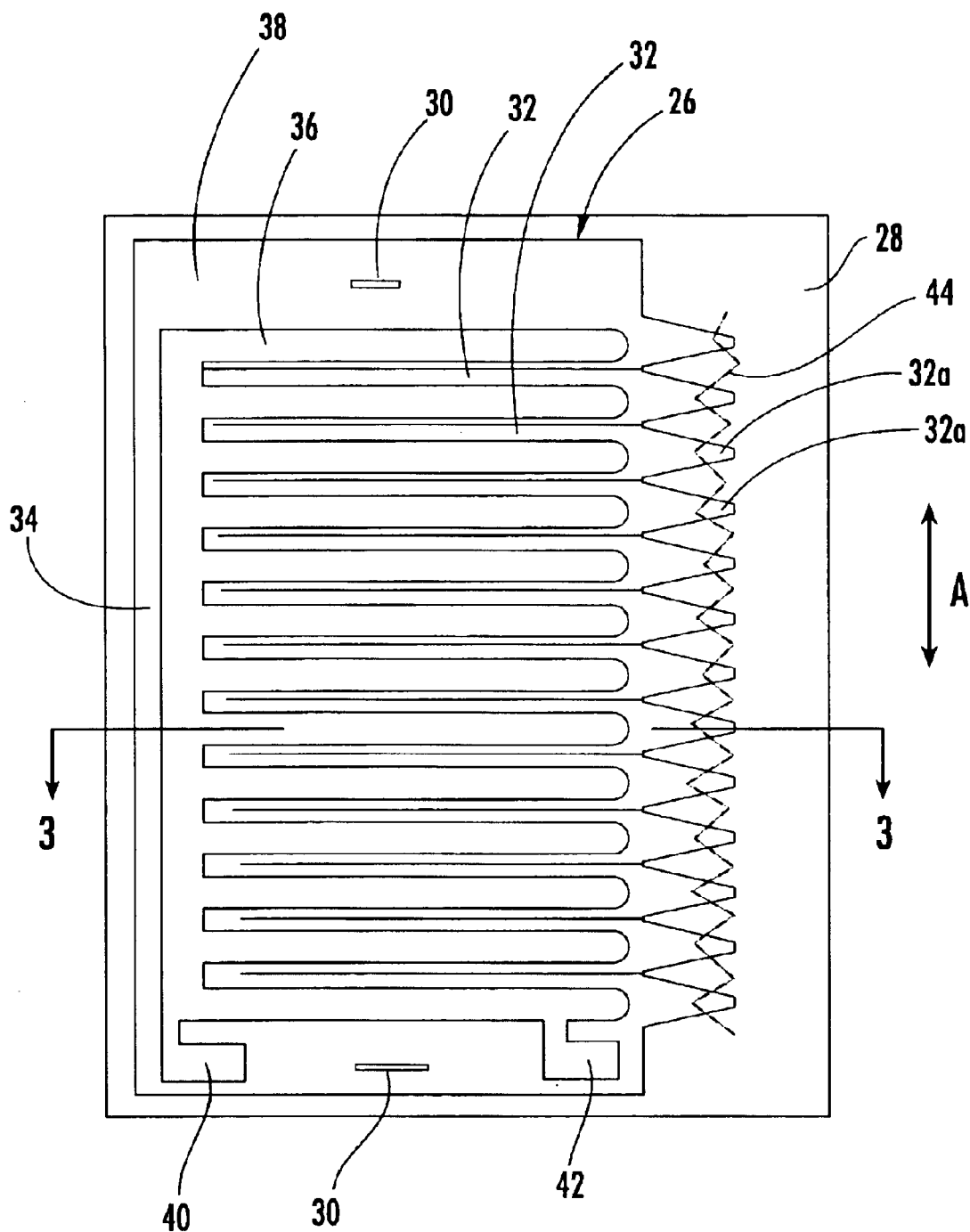
FIG. 2 is a top plan view of heating elements affixed to a stretch fabric panel.

First, in FIG. 2, a panel 28 of stretchable material is provided which is preferably, stretch polyester or lycra fabric material. An array of heating elements 26 are placed over the top surface of the panel 28 of stretchable material and secured into place by, preferably, stitching 30. The heating elements 26 are provided in an array that includes a number of finger elements 32 that emanate rightwardly from a base element 34. In each of the fingers 32 and the base element 34 is provided electrically resistive material 36 located on a substrate layer 38, such as plastic. The resistive layer 36 may be any type of electrically resistive material, such as sintered metal or nichrome. Electrical contact pads 40 and 42 are provided at the bottom portion of the heating element array 26. As will be described in detail below, the finger elements 32 are capable of separating from one another while still being able to provide heat along each finger 32.

Of course, it should be understood that the heating element array 26, shown in FIG. 2, is one of many different types of arrays that are contemplated by and within the scope of the present invention. However, the construction of a number of fingers 32 emanating from a base element 34 is particularly well-suited for accommodating an object of the size and configuration of a baby bottle for close conformation and optimal heat transfer.

Figure 3:
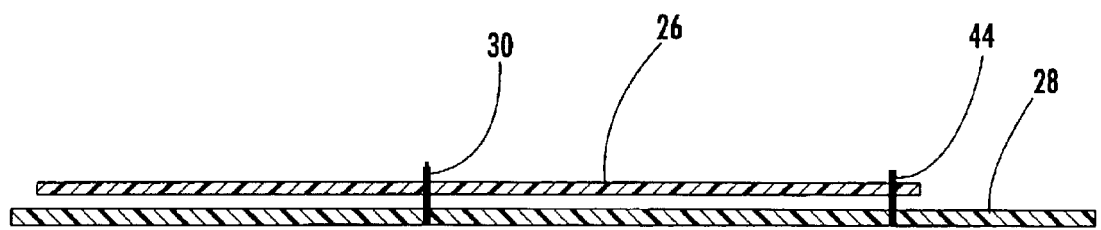
FIG. 3 is a cross-section view through the line 3—3 of FIG. 2.

The heating element array 26 is preferably secured to the stretch polyester material 28 by stitching. FIG. 3 illustrates a cross-section of this construction. Preferably, in accordance with the present invention, the top and bottom portions are secured using stitching 28. Also, the free ends 32a of the finger heating elements 32 are secured to the polyester material 28 using zig zag stitching 44. Such stitching technique permits the fingers 32 to separate from one another to accommodate a bottle 12 within the apparatus 10 and, particularly, bottles 12 that are of different sizes and configurations. Thus, the fingers 32 are permitted to stretch in a lengthwise direction indication by the arrow referenced A in FIG. 2.

An electrical interface, such as cigarette lighter adapter 18, is electrically connected to the contact pads 40 and 42 on the heating element array 36. As seen in FIG. 1, a two-conductor wire 24 can be attached to the contact pads 40, 42 for providing electricity from a 12 volt cigarette lighter receptacle (not shown) of a vehicle via the vehicle lighter adapter 18. In this case, the heater element array 26 is constructed and designed to receive a 12 volt input power source. However, a vehicle lighter adapter 18 is one of many different sources of electricity that can be provided to the apparatus 10 of the present invention. For example, heater element array 26 can be adapter to receive electricity from a standard 110 volt domestic power source.

Figure 4:
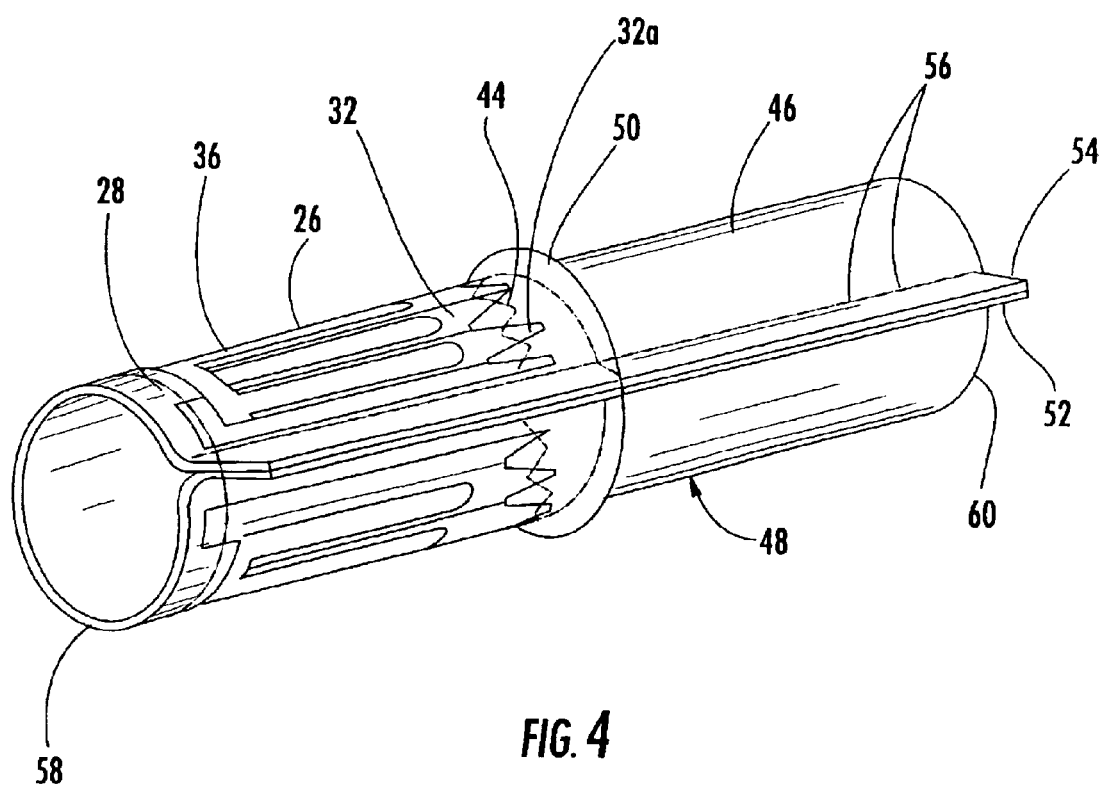
FIG. 4 is a perspective view of a tube of neoprene material attached to the stretch fabric panel and heating elements formed into a long tube.

Once the heating element array 26 is affixed to the stretch polyester fabric 28, a rugged panel 46 is attached thereto. As shown in FIG. 4, neoprene, or other similar material, is affixed to the top free end of the stretch polyester layer 28 and the two layers 28, 46 are rolled together to form an elongated tube, generally referred to as 48. The neoprene panel 46 is preferably secured to the stretch polyester panel 28 by stitching 50. For ease of construction, the elongated tube 48 is formed by mating the longitudinally running edges 52, 54 of the stretch polyester panel 28 and the neoprene panel 46 together. The edges 52, 54 are secured together by stitches 56 to form the desired elongated tube 48 with edges 58 and 60.

Figure 5:
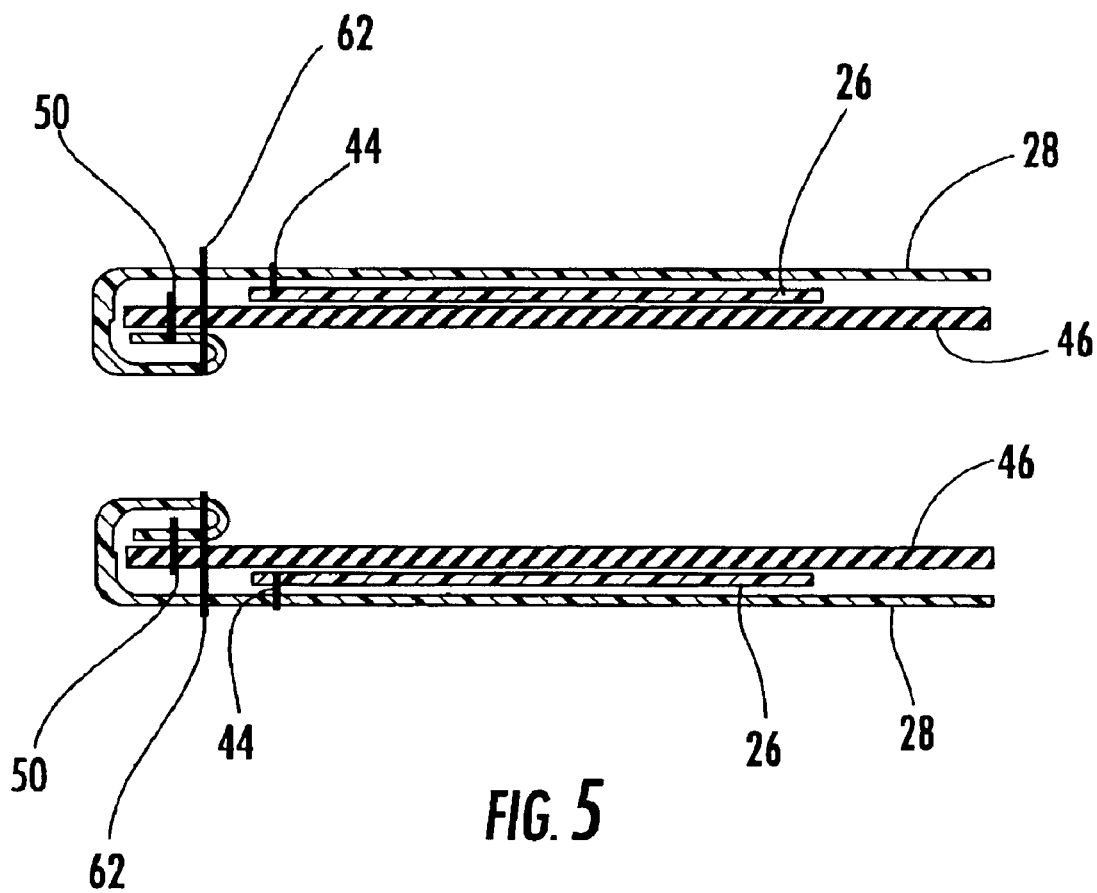
FIG. 5 is a cross-sectional view showing the stretch fabric and heating elements folded over the neoprene material.

As shown in FIG. 5, the stretch polyester panel 28 is then folded over the neoprene panel 46 with the heating element array 26 residing therebetween. After the stretch polyester panel 28 is folded over the neoprene panel 46, the mouth opening for the apparatus of the present invention is secured with a series of zig zag stitches 62 to permit flexing of the lay up of panels 28, 46, namely, the flexing and expansion of the heating element fingers 32 in heating element array 26.

Figure 6:
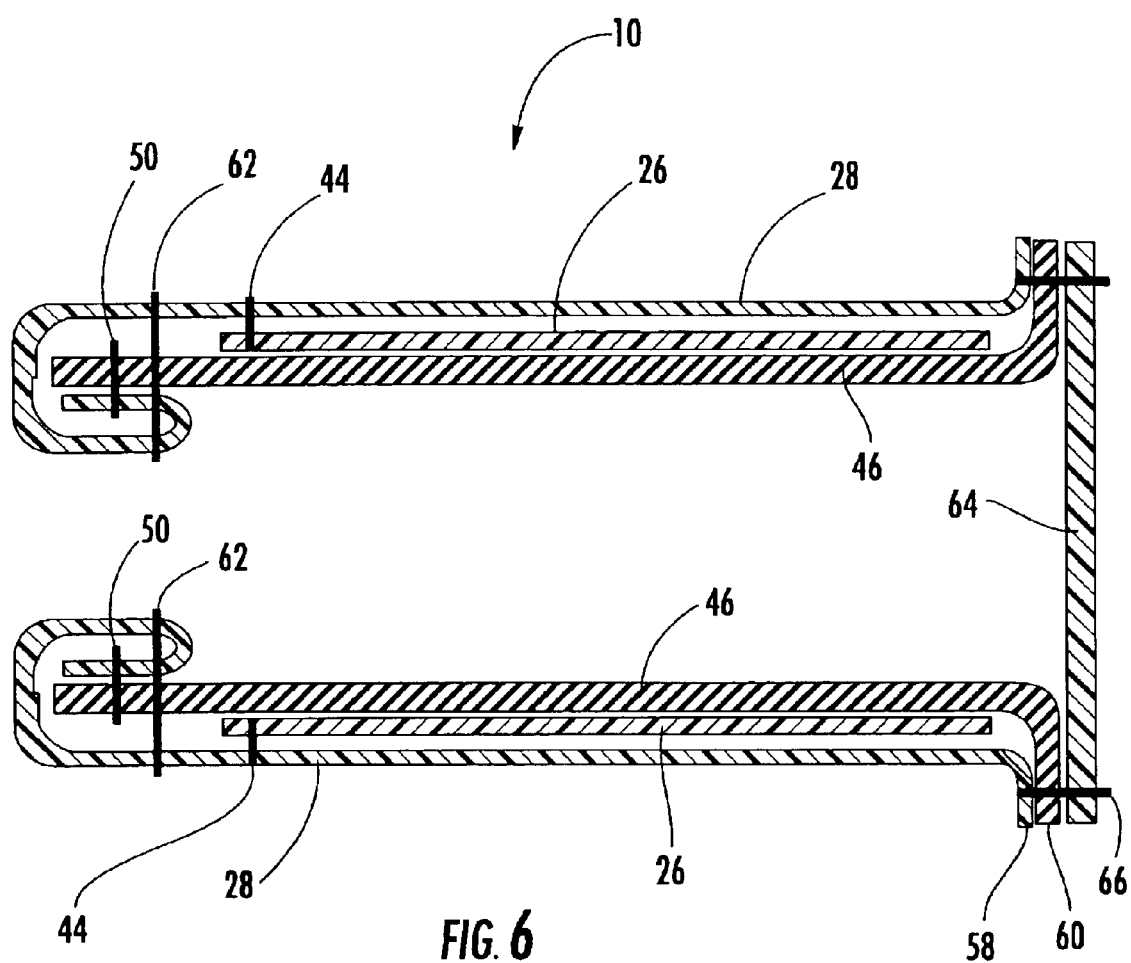
FIG. 6 is a cross-sectional view showing the attached of bottom cap.
Figure 7:
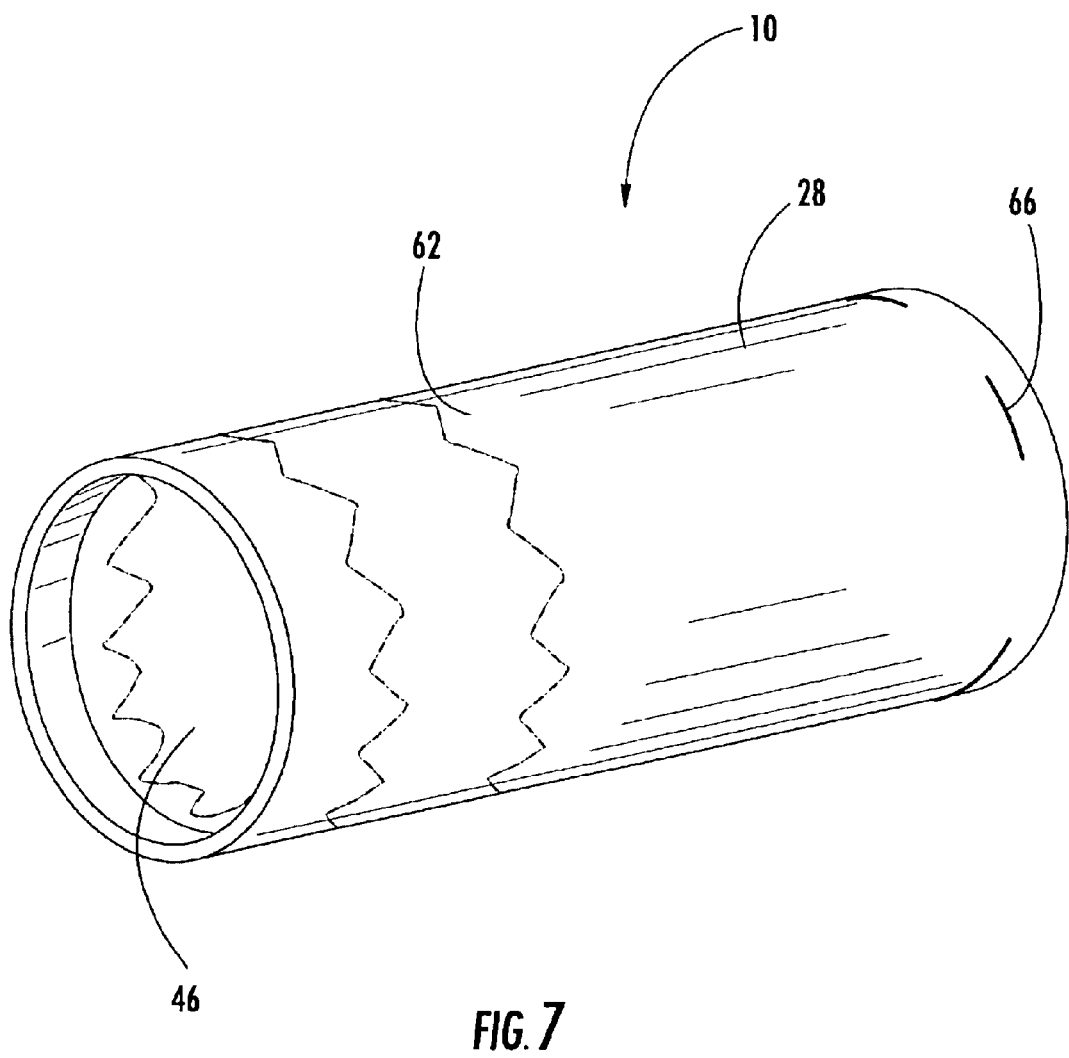
FIG. 7 is a perspective view of the structure shown in FIG. 6.

Next, as seen in FIG. 6, a bottom cap 64 is affixed by stitches 66 onto the edges 58, 60 of polyester panel 28 and neoprene panel 46, respectively to provide a floor for the apparatus 10 of the present invention. A perspective view of the construction of FIG. 6 is shown in FIG. 7. While having some 'floor' to the apparatus is a feature of the preferred embodiment, the absence of such feature is contemplated and such construction is intended to be within the scope of the invention.

The entire construction 10 is then turned inside out so that the neoprene panel layer 46 is on the outside of the apparatus 10 and the stretch polyester layer 28 is on the inside of the apparatus. For convenience of illustration, the electrical interface is not shown in FIGS. 3–7.

Figure 8:
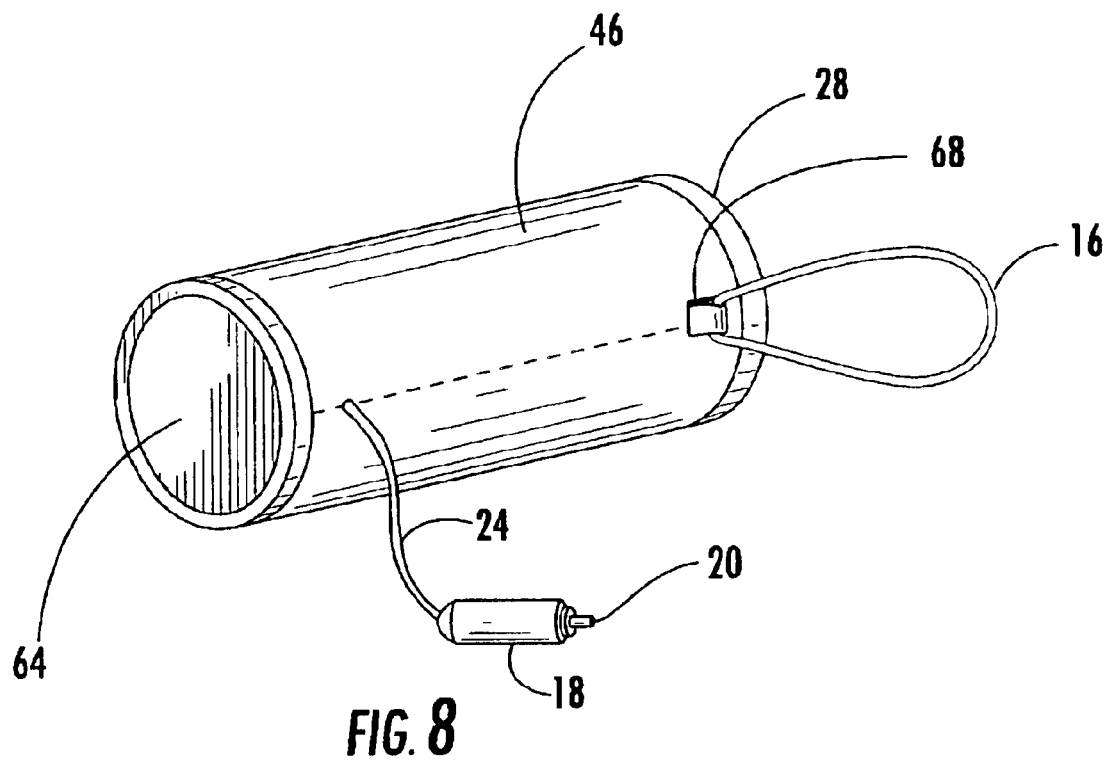
FIG. 8 is a perspective view of a completed bottle warmer in accordance with the present invention.

Once turned inside out, as shown in FIG. 8, the apparatus 10 for heating a bottle 12 is ready for use. Optionally, a lanyard 16 is secured to the outer surface of the apparatus 10, namely the neoprene panel layer 46, by a loop 68. The loop 68 may be made of fabric or plastic material and can be stitched or otherwise affixed to the outer neoprene panel 46 of the apparatus 10. The lanyard 16, in the form of a rope or rubber gasket, is routed through the loop 68 to permit the apparatus 10 to be hung from a support, such as a control knob in a vehicle (not shown). Using a loop 68 and lanyard 16 are one of many different ways to provide a structure for hanging the apparatus 10 from a support.

The metal, metallic or metallized material 36 comprising the actual electrically conductive component(s) of the heating element array, by nature has no functionally effective elongation properties. So, while this conductive element material 36 itself and its covering may be manufactured to be quite flexible, the complete element array 26 can only elongate (i.e. functionally "stretch"), if its assembled configuration is such that the individual element components 32 are either interconnected by other flexible materials, and/or if the array configuration 26 is of a construction that by the act of bending individual components and/or utilizing layers of individual components that also slide across each other, allows the assembled element array 26 to effectively "stretch" in one or multiple directional orientations. There are many common ways in which this is accomplished: in the same manner that a patterned series of perforating cuts allows a solid sheet of metal to be stretched (i.e. "expanded metal"), in the same manner that flexible chain link fencing and other such lattice-like arrangements have an assembled configuration with greater flexibility and stretch than that of the comprising component parts.

The foregoing construction, although preferred, is one of many different ways to manufacture the apparatus 10 of the present invention. For example, the heating element array 26 may be insert molded directly into a flexible and expandable main body to receive bottles 12 of different sizes and configuration. Such alternative constructions are intended to be within the scope of the present invention. In that connection the heating element array 26 itself may be of different constructions and still be within the scope of the present invention. For example, the heating element array 26 can be flexible wire or fabric-like in construction, configured from a single piece unit or comprised of joined multiple individual components to permit the desired expansion of the heating elements 26 as contemplated by the present invention.

To provide a compact apparatus, it is preferred that the stretch polyester panel 28 stretches in the lengthwise direction indicted in FIG. 2 so that, when in a completed apparatus 10, the apparatus 10 expands radially outward to accommodate bottles 12 of different sizes and configurations. It is also contemplated that the stretch polyester fabric 28 also stretches widthwise if the fingers 32 of the heating element array 26 are arranged in a different fashion. In sum, the direction of stretching of the polyester panel 28 and the neoprene 46 can be controlled in view of the arrangement of the heating element array 26.

Referring back to FIG. 1, the apparatus 10 of the present invention is shown with a baby bottle 12 installed therein.

The bottle 12 is inserted into the mouth 70 of the apparatus 10 and is pushed downwardly until it is firmly seated. The bottle 12 easily slides into the apparatus in communication with the polyester stretch material 28. The outer neoprene material 46 is rugged in construction but also provides a good grip for the user of the apparatus 10. Also, the neoprene material 46 is easy to clean. As stated above, other materials may be employed for these purposes.

As can be seen, the baby bottle 12 is stretching the lay-up of panels 28, 46 causing the finger elements 32 to separate and, thereby, conform to the outer dimensions of the baby bottle 12. For ease of illustration, two of the finger heating elements 32 are shown. With the unique heating element fingers 32 of the present invention, the apparatus 10 can more closely conform to a baby bottle 12 than prior art devices. There is no need to strap the apparatus 10 onto the baby bottle 12 as required by the prior art wrap-style apparatuses because the heating element array 26 in the present invention has fingers 32 that are precisely positioned with their free ends 32a expandably secured to permit the desired controlled expansion of the panels 28, 46 and heating element array 26 contained therein. Thus, the bottle 12 is simply inserted into the apparatus 10 and it automatically conforms to the shape of the bottle 12.

In view of the foregoing, an apparatus 10 for heating or warming an object, such as baby bottle 12 is provided which is superior to known prior art devices. The apparatus 10 of the present invention is easier to install over a baby bottle 12 than prior art devices and is more effective because it more closely conforms to the bottle 12 itself.

It would be appreciated by those skilled in the art that various changes and modifications can be made to the illustrated embodiments without departing from the spirit of the present invention. All such modifications and changes are intended to be covered by the appended claims.

What is claimed is:

1. An apparatus for warming a vessel having an outer surface with contents therein, comprising:
    a panel of expandable material formed into a tube having a top opening and a bottom opening;
    a plurality of heating elements, having free ends, attached to the stretchable material; the heating elements including a plurality of finger heating elements emanating from a single base heating element; the finger heating elements separating from one another and conforming to a vessel residing within the tube;
    means for interconnecting the heating elements to a power supply to heat up the heating elements;
    whereby the panel of expandable material with heating elements attached thereon being closely conformed to the outer surface of a vessel for warming the contents contained therein.

2. The apparatus of claim 1, wherein the panel of expandable material includes a layer of stretchable polyester and a layer of neoprene.

3. The apparatus of claim 2, wherein the plurality of heating elements reside between the layer of stretchable polyester and the layer of neoprene.

4. The apparatus of claim 1 wherein a bottom cap of neoprene is attached to the tube to close the bottom opening.

5. The apparatus of claim 1, further comprising:
    a lanyard attached to the panel of flexible material.

6. The apparatus of claim 1, wherein the means for interconnecting the heating elements to a power supply to heat up the heating elements is a cigarette car lighter adapter.

7. The apparatus of claim 1, wherein the heating elements are attached to the panel of expandable material by zig zag stitching.

8. The apparatus of claim 1, wherein the heating elements include electrically resistive material.

9. The apparatus of claim 1, wherein the free ends of the heating elements are tapered.

10. A method of manufacturing an apparatus for heating a vessel, comprising the steps of:

providing a panel of stretchable polyester material having a first side and a second side and a top end and a bottom end;

attaching an array of heating elements to the stretchable polyester material;

attaching a panel of neoprene to the top end of the panel of stretchable fabric;

forming the panel of stretchable polyester material and panel of neoprene, with heating elements on the panel of polyester material, into a tube having a first length;

folding the panel of stretchable polyester over the panel of neoprene into a tube having a second length shorter than the first length; the tube having a open bottom end and an open top end; and securing the panel of stretchable polyester to the panel of neoprene.

11. The method of claim 10, further comprising:

attaching a bottom cap to the open bottom end.

12. The method of claim 10, further comprising the step of:

securing the panel of stretchable polyester to the panel of neoprene with zig zag stitching.

13. The method of claim 10, further comprising the steps of:

attaching an array of heating elements to the stretchable polyester material with zig zag stitching.

14. The method of claim 10, further comprising the step of:

turning the panel of stretchable polyester and panel of neoprene inside out.

15. The method of claim 13, further comprising the step of:

attaching a lanyard to the panel of neoprene.

* * * * *